United States Patent Office 3,671,394
Patented June 20, 1972

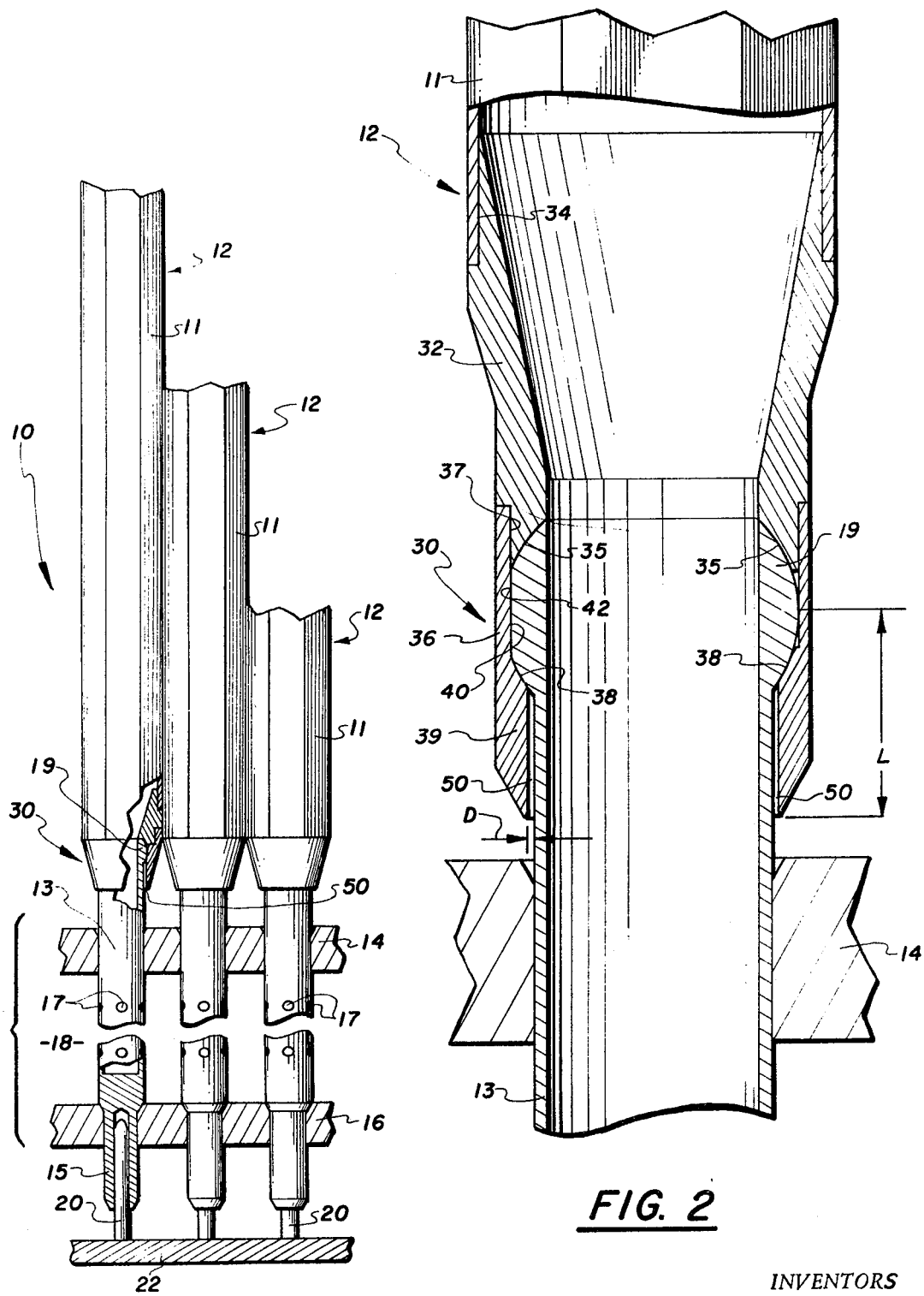

3,671,394
ARTICULATED FUEL ELEMENT HOUSING
Louis Bernath, Canoga Park, and Joseph V. Facha, Reseda, Calif., assignors to North American Rockwell Corporation
Filed Dec. 29, 1969, Ser. No. 888,244
Int. Cl. G21c 3/10
U.S. Cl. 176—79                             5 Claims

ABSTRACT OF THE DISCLOSURE

An articulating ball joint integral with and near the base of a plurality of nuclear reactor fuel elements to compensate for bowing distortions and stresses caused by an adverse thermal environment within the core of a reactor which allows for a slight misalignment minimizing component stresses in the housing of each of the fuel elements.

BACKGROUND OF THE INVENTION

Nuclear reactor fuel elements in a reactor core of the type utilized in, for example, a fast breeder reactor, undergo physical changes along their axial length when irradiated which include bowing due to differential effects of irradiation swelling and dilation (swelling) of the structural components of the housing between the two fixed ends of the element. If there are no means to compensate for the bowing of the individual fuel elements, then the possibility of exceeding the structural limitations of the material used in fabricating the element becomes a possibility. Similarly, fuel element distortions occur when each element is subjected to adverse thermal conditions where one of its longitudinal sides is at a greater temperature than its opposite side. The fuel element will become distorted and tend to bow convexly in the direction of the greatest temperature. This bowing effect, whether thermally activated or due to swelling, imparts strain to the element housing and associated hardware particularly in the region just above the bottom support plate or tube sheet rigidly retaining the base portion of each of the fuel elements within the reactor core assembly; such strain may create an operational hazard or may require limitation of the life (longevity) of the element to economically unattractive durations.

A typical fuel element for a fast breeder reactor is of the closed housing type and requires that the housing be flexible through the high heat flux region. There must be a clamping arrangement for the fuel element to retain the element in a "tight" core assembly (orientation and position relative to neighboring elements) for proper reactor control yet each element must be able to distort as hereinbefore described. The upper and lower ends of each assembly are held essentially vertically and in line by the engagement of the lower end of the element in support plates or tube sheets, the top of the element being tightly clamped in a packed matrix of interfitting hexagonally shaped members. The lower end of each element penetrates the space between a pair of tube sheets which serve as a plenum chamber for a coolant liquid which enters the interior of each element through a series of orifices therein, communicating with the plenum chamber and the interior of each element thereby permitting flow to provide cooling of the fuel pins within the element. Thus, the lower end of each element is rigidly held by the two tube sheets. The region between the lower tube sheets and the upper clamped end of each element is the flexible region wherein each of the plurality of fuel elements are allowed to distort due to the swelling of each element and to the high thermal forces induced therein. The swelling and bowing of the elements in the high flux region heretofore described can cause element jamming or permanent distortions of the elements due to the permanent set of the elements after they have been bowed.

The region of highest stress on the housing of the fuel element is the region immediately above the uppermost tube sheet which defines the coolant plenum chamber. The out-of-axial-alignment condition of the fuel elements in the high heat flux region propagates to a point just above the fixed plate which rigidly holds the bottom of the element, and the out-of-alignment condition of the bowed elements can be as much as three to five degrees.

Therefore, it is an object of this invention to provide a means to accommodate or make allowances for the out of alignment condition of each of the fuel elements within a nuclear reactor.

More specifically, it is an object of this invention to provide an articulating joint near the bottom of each of the nuclear fuel elements to compensate for any misalignment which might occur due to bowing and swelling of each of said elements, and thus to limit structural forces resulting from such effects to levels tolerable within the environmental conditions of the reactor.

SUMMARY OF THE INVENTION

The present invention includes a ball joint which is physically located along the axial length of the nuclear fuel elements directly above and spaced from a pair of tube sheets which rigidly retains each of said elements at their base and provides for a plenum chamber for coolant liquid which enters each element through orifices in the element. The articulated ball joint being located directly above the uppermost tube sheet allows for misalignment of each fuel element housing which is caused to be out of alignment or bowed due to the cumulative effects imparted via the high flux region and the resultant stresses therein. The articulated ball joint is so designed to allow for a maximum deflection for each of the fuel elements. The ball joint device includes a lower fixed skirt which has an annular concentric gap between the fuel element lower portion and the hinged point of the ball joint which limits the maximum deflection of the element extending above the uppermost tube sheet to five degrees of deflection. The lower skirt prevents the fuel element from exceeding the structural limitations of the materials used in fabrication of both the element and the articulated joint thereby providing an additional safety factor.

Each of the ball joints includes a keyed flat portion on the surface of the interior ball so that the upper element can be self-aligning with the lower portion of the element which contains the ball and is rigidly affixed to the upper and lower tube sheets that define the coolant plenum chamber thus providing for self-alignment of the upper and lower portions of the element being connected through the articulated ball joint.

An advantage of the articulated joint is the ability to allow for bowing of each nuclear fuel element in the high flux region without exceeding the structural limitations of the materials used in the housing of the element.

A further advantage of the articulated joint is the extendable skirt which extends below the articulated ball portion of the element thereby preventing the element from exceeding the three to five degrees out of axial alignment of each of said elements, thus providing for an additional safety factor.

A still further advantage is the specific design of the articulated ball joint that will withstand the loads imposed upon the fuel elements while they are inserted or removed from the core of the reactor.

Another advantage of the articulated ball joint is the flat surface within the articulated joint which assures a self-aligning function thereby correctly mating the upper element with the lower rigidly affixed element thereby providing for an inherent alignment function through the articulated joint.

Still another advantage is the specific design of the ball joint which minimizes any leakage that might occur through the joint while still allowing for a maximum of five degrees of deflection of the element.

DESCRIPTION OF THE DRAWINGS

These and other advantages and objects of the present invention will be more fully understood upon the study of the following detailed description with the detailed drawings in which:

FIG. 1 is a vertical section of a portion of a nuclear reactor core which contains a plurality of reactor elements, and FIG. 2 is an enlarged view of the articulated joint which is located just above the upper tube sheet which contains and restrains the plurality of fuel elements.

Turning now to FIG. 1, a reactor vessel (not shown) consists of a core assembly 10 which contains a number of fuel elements generally designated as 12. Each of the hexagonally-shaped fuel elements are clamped together near their top (not shown) while at the bottom the elements extend through a pair of tube sheets 14 and 16 which define a liquid coolant plenum chamber 18 for cooling each of the elements 12. The base or steam 13 of the fuel element 12 is in fluid tight engagement with tube sheets 14 and 16 extending below plate 16. The end 15 of stem 13 is in engagement with a stake 20 which is connected to plate 22. The stake 20 combined with the lower stem portion 13 of fuel element 12 provides assurance that proper placement of fuel elements 12 are achieved in the reactor core 10. The stem 13 has a plurality of holes 17 in the stem which communicate with plenum coolant chamber 18 to allow the coolant to enter the interior of the fuel elements 12 thereby cooling the fuel pins within the element. The top end of the stem 13 extending into the base of the fuel elements 12 terminates into a ball socket 30 which is rotatable within a socket made up of various parts of the element 12 which will be more fully defined in FIG. 2.

A swivel joint assembly generally designated as 30 allows for a three to five degree deflection or deviation from the normal axis of the element at a critical point along the length of the element 12, namely the location just above tube sheet 14. The dangers of over-stressing the material limits of the metals used to fabricate the elements 12 are at their highest just above the plate 14 due to the fact that the lower stem assembly 13 is rigidly affixed at the tube sheet locations at the base of the element 12. The articulated assembly 30 permits the fuel elements 12 to flex and bow out of normal axial alignment without the danger of overstressing the materials within the element housing 11.

Turning now to FIG. 2 the articulated swivel assembly 30 is comprised of a fuel element stem 13 which terminates at its upper end in a ball 19 which nests in a socket comprised of an upper conically shaped transition member 32 which is metallurgically bonded to the fuel element housing 11 at juncture 34 at its upper end. The base 60 of the transition extension member 32 forms part of the upper socket seat 35. A lower annular skirt 36 surrounds and extends below ball 19 a predetermined distance L. An internal spherical bottom seat 38 conforms to the base of the ball 19 and serves to support the ball complementing the spherical mating surface 35 of transition member 32. One side of the ball 19 is shaved off forming a flat surface 40 which mates with a corresponding flat surface 42 formed on the interior wall of annular skirt 36. The total area designated as 40 need not be more than 10 to 15 percent of the bearing surface of ball 19 to provide adequate rigidity for alignment of stem 13 with element 12. The flat surface 40 and the mating surface 42 serves to self-align the stem member 13 and keep it rigid enough to guide the lower stem member into the correct aperture in tube sheet 14 when the element 12 is inserted in the core. In general, the ratio of $L/D$ in swivel assembly 30 will vary from $\frac{1}{10}$ to $\frac{1}{20}$. The lower annular skirt portion 39 extending below the ball 19 has an inner annular concentric opening 50 which is larger than the diameter of the exterior surface of stem 13 so that the annular gap 50 allows for any axial deflection of the upper fuel elements 12 within three to five degrees of an out-of-alignment condition. Obviously, the gap indicated as D can be either enlarged or reduced, dependent upon the amount of deflection desired. The skirt portion 39 of annular skirt 36 provides a means to limit the amount of articulation of swivel assembly 30 thereby preventing any catastrophic failure of the fuel element 12 at the juncture immediately above the tube sheet 14. The annular member 36 is metallurgically bonded or welded at juncture 37 thereby completing the swivel assembly 30.

The articulating assembly 30 can take axial loads either in compression or in tension which might be applied when the fuel elements are inserted within (or withdrawn from) the nuclear core 10. These loads sometimes are greater than the loads that normally occur during the operation of the nuclear reactor; thus, the design of the articulating member must incorporate the ability to withstand these added loads, both when the assembly is new and when the nuclear fuel element has completed its useful life.

The spherical mating surfaces 35 and 38 of transition member 32 and annular skirt assembly 36 provide a virtually liquid tight engagement with the spherical ball 19 of stem assembly 13 thereby preventing any excessive amount of leakage of the coolant liquid entering orifices 17 (FIG. 1) of stem 13 thereby allowing for a lesser amount of coolant than might normally be required if there is an excessive amount of leakage out of the elements 12, thus providing for a more efficient cooling apparatus. The articulated swivel assembly could be utilized in other areas along the longitudinal length of the fuel elements without going beyond the scope of this invention. Other types of articulating joints would probably not have this advantage.

We claim:

1. An articulating apparatus to compensate for out of axial alignment distortions of a nuclear reactor fuel element within a reactor core assembly comprising a hollow extension from a main housing forming said element,
   a separate stem member in substantial axial alignment with said extension and extending therein,
   said extension and said stem member having complementary bearing surfaces on their inner periphery and outer periphery respectively, said complementary bearing surfaces including a ball member forming one of said bearing surfaces and a convex circumferentially shaped seat conforming to the shape of the ball member forming the other of said bearing surfaces, said bearing surfaces being cooperatively disposed so as to maintain said member and said extension in flexible continuous mechanical engagement and responsive to the transmission of axial forces between said member and said extension,
   a tube sheet extending transversely of said stem member for rigidly supporting said stem member,
   means forming an aperture in said tube sheet through which said stem member extends, and
   means on said extension extending between said complementary bearing surfaces and said tube sheet to limit the degree of permitted angular deflection of said element and relative movement of said bearing surfaces.

2. The invention as set forth in claim 1 wherein said ball member is on said stem member and said convex circumferentially shaped seat is on said extension bearing surface.

3. The invention as set forth in claim 1 wherein the means formed on said extension to limit the degree of distortion is an annular skirt member dependent from said internal bearing surface, said skirt member being spaced from said stem member and forming an annular gap therebetween, the gap being a set distance thereby limiting the degree of relative movement of said bearing surfaces.

4. The invention as set forth in claim 3 wherein the annular gap formed by said skirt and said stem limits the degree of distortion of said element to five degrees from axial alignment within said core assembly.

5. The invention as set forth in claim 1 further including alignment means within said complementary bearing surfaces comprising a flat surface formed on an interior wall of said extension and a corresponding flat surface on an exterior surface of said stem member so that, when the two bearing surfaces are aligned with one another, the element and the stem are substantially in axial alignment.

References Cited

UNITED STATES PATENTS

| | | | |
|---|---|---|---|
| 3,238,105 | 3/1966 | McNelly | 176—79 X |
| 3,231,476 | 1/1966 | Thome | 176—79 X |
| 3,515,638 | 6/1970 | Nims | 176—78 X |
| 3,230,146 | 1/1966 | Astley et al. | 176—78 X |
| 3,303,099 | 2/1967 | Johnston | 176—79 X |
| 3,146,173 | 8/1964 | Fortescue et al. | 176—37 X |
| 3,141,829 | 7/1964 | Fortescue et al. | 176—68 |

BENJAMIN R. PADGETT, Primary Examiner

G. G. SOLYST, Assistant Examiner

U.S. Cl. X.R.

176—40, 81, 87